(12) United States Patent
Sumner et al.

(10) Patent No.: US 9,590,367 B1
(45) Date of Patent: Mar. 7, 2017

(54) ELECTRICAL PLUG ADAPTER

(71) Applicant: DELPHI TECHNOLOGIES, INC., Troy, MI (US)

(72) Inventors: Randall C. Sumner, New Wilmington, PA (US); Terry A. George, Salem, OH (US); Steven A. Musick, Burton, OH (US); Robert James Myers, Saline, MI (US); Eric Oswin Gottschling, Washington Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/843,215

(22) Filed: Sep. 2, 2015

(51) Int. Cl.
| H01R 25/00 | (2006.01) |
| H01R 13/66 | (2006.01) |
| H01R 13/703 | (2006.01) |
| H01R 31/06 | (2006.01) |

(52) U.S. Cl.
CPC ..... *H01R 13/6683* (2013.01); *H01R 13/6691* (2013.01); *H01R 13/703* (2013.01); *H01R 31/065* (2013.01)

(58) Field of Classification Search
CPC .. H05K 1/0201; H05K 1/0209; H05K 3/0061; H05K 7/20; H05K 7/20154; H01R 13/641; H01R 39/58; H01R 13/70; H01R 13/703; H01R 13/7039
USPC .......................... 439/638, 485, 188, 488, 489
See application file for complete search history.

(56) References Cited

U.S. PATENT DOCUMENTS

| 6,717,820 | B1 | 4/2004 | Loh |
| 7,258,549 | B2 | 8/2007 | Asahi et al. |
| 7,465,176 | B2 * | 12/2008 | Liao ....................... H01R 27/00 439/172 |
| 7,556,535 | B2 * | 7/2009 | Liao ................... H01R 13/6273 439/640 |
| 7,807,499 | B2 | 10/2010 | Nishizawa |
| 8,379,403 | B2 | 2/2013 | Waite et al. |
| 8,797,174 | B2 * | 8/2014 | Chen ................... H01R 13/665 340/573.1 |
| 2004/0022038 | A1 | 2/2004 | Figueroa et al. |
| 2008/0251906 | A1 | 10/2008 | Eaton et al. |
| 2010/0304590 | A1 * | 12/2010 | Frassineti ................ H01H 1/58 439/196 |
| 2010/0315752 | A1 * | 12/2010 | Rabu ...................... H01R 31/06 361/103 |
| 2012/0091824 | A1 * | 4/2012 | Campolo ............ B60L 11/1818 307/135 |

(Continued)

*Primary Examiner* — Abdullah Riyami
*Assistant Examiner* — Thang Nguyen
(74) *Attorney, Agent, or Firm* — Robert J Myers

(57) ABSTRACT

An electrical adapter assembly including an adapter housing, an electrical receptacle defined by a first technical standard that is disposed within a first face of the adapter housing. The receptacle is configured to receive a first electrical plug defined by the first technical standard. The electrical adapter assembly also includes a second electrical plug defined by a second technical standard projecting from a second face of the adapter housing and electrically interconnected to the electrical receptacle and a thermally conductive member disposed within the adapter housing and projecting from the first face of the adapter housing. The electrical adapter assembly also contains features for detecting a connection of the electrical adapter assembly to the first plug.

19 Claims, 9 Drawing Sheets

(56) References Cited

U.S. PATENT DOCUMENTS

| | | | |
|---|---|---|---|
| 2012/0220167 A1* | 8/2012 | Walls, Jr. | H01R 31/06 439/638 |
| 2013/0162053 A1* | 6/2013 | Iizuka | H01H 47/00 307/140 |
| 2013/0330974 A1* | 12/2013 | Chen | H01R 13/665 439/638 |
| 2014/0099808 A1* | 4/2014 | McClelland | H01R 13/6205 439/153 |
| 2014/0273571 A1* | 9/2014 | Iyer | H01R 13/53 439/183 |
| 2015/0318638 A1* | 11/2015 | McClelland | H01R 13/629 439/105 |
| 2016/0064883 A1* | 3/2016 | Macauda | B25F 5/00 439/40 |

\* cited by examiner

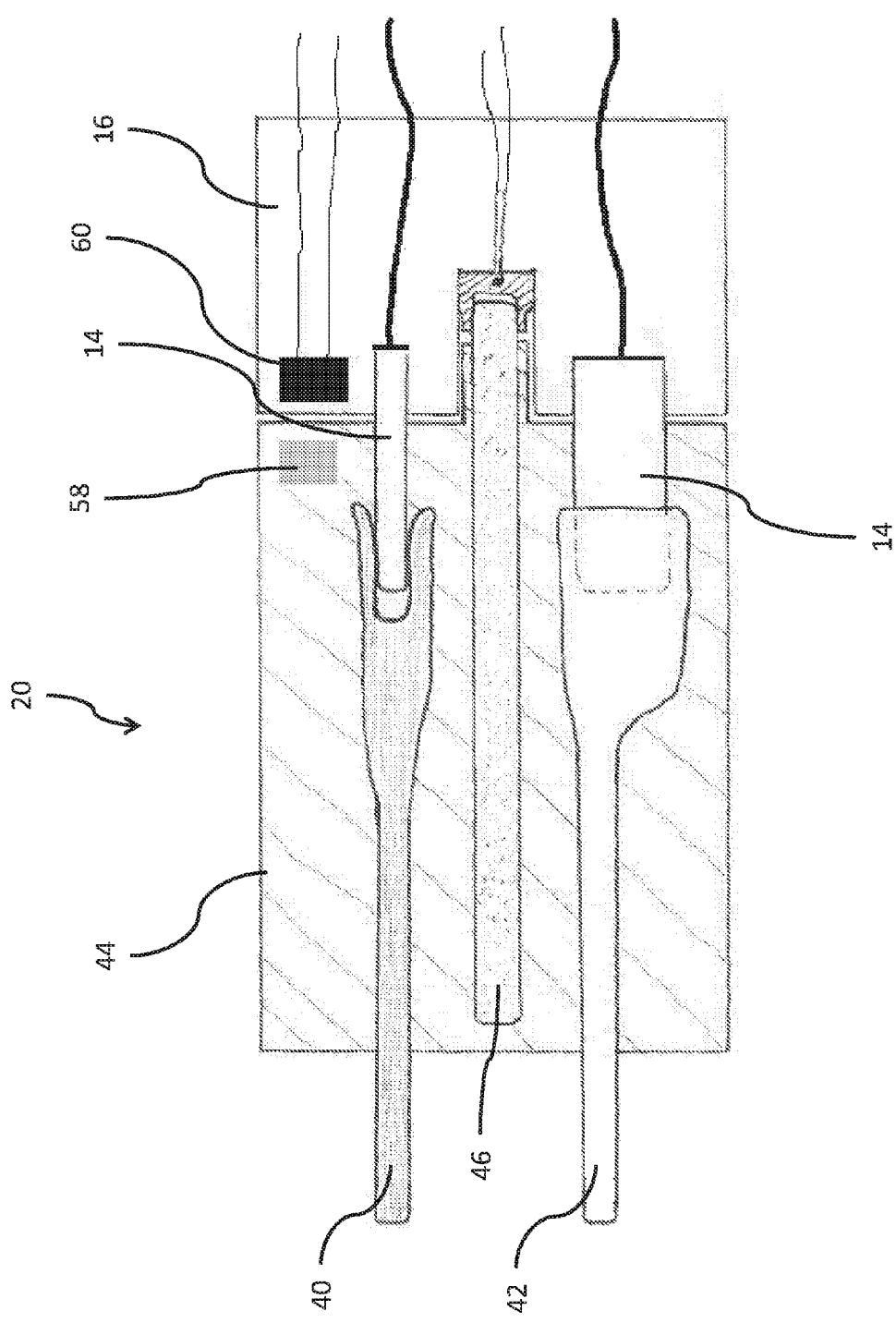

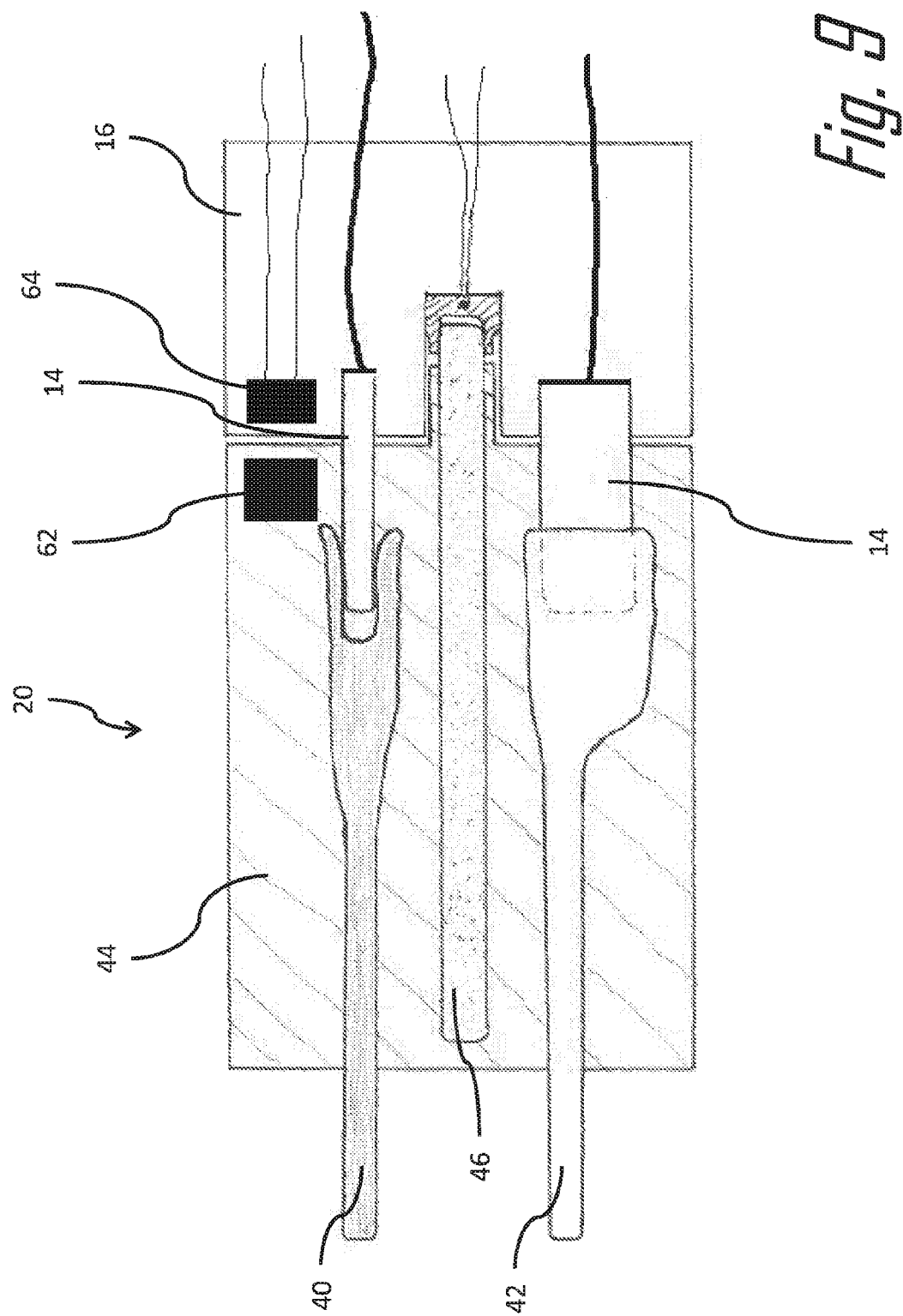

ELECTRICAL PLUG ADAPTER

CROSS-REFERENCE TO RELATED APPLICATION

This application is related to U.S. patent application Ser. No. 14/746,019, filed on Jun. 22, 2015, the entire disclosure of which is hereby incorporated by reference.

TECHNICAL FIELD OF THE INVENTION

The invention relates to an electrical plug adapter, particularly an electrical plug adapter configured to allow a plug connector meeting a particular plug configuration standard to mate with a receptacle meeting a different and incompatible receptacle configuration standard.

BACKGROUND OF THE INVENTION

National technical standards exist to define the physical and electrical characteristics of electrical plugs and their associated receptacles. The intent of these technical standards is to promote safety and operability between power sources and electronic devices that require electrical power. Historically, a particular electronic device would be designed for a specific source voltage and maximum current source and so would be manufactured with a fixed plug that is configured to insert into its complementary power-source receptacle. For example, an electronic device in North America requiring 220 volts and drawing a maximum current of 20 amperes would be supplied with a plug meeting the National Electrical Manufacturers Association (NEMA) 6-20 standard configured for insertion into a receptacle also conforming to the NEMA 6-20 standard. However, the NEMA 6-20 plug cannot be inserted into a receptacle capable of providing a lower 110 volt source voltage, such as a NEMA 5-15 standard receptacle.

However, electronic devices are currently being manufactured that have built-in power electronics capable of converting various input voltages into an appropriate electrical power for the device. While an electronic device might be configured with a NEMA 6-20 plug, it may be also operable with power provided by a NEMA 5-15 receptacle, even though not physically able to be inserted into the NEMA 5-15 without a plug adapter of some sort.

Plugs may include thermal sensing devices that monitor the temperature of the plug/receptacle junction. The electronic may be programmed to take protective countermeasures, such as reducing power or shutting down if the sensed temperature of the receptacle/plug junction exceeds a temperature threshold. However, the use of an adapter may separate the plug from the receptacle and the thermal sensor in the plug is isolated from the adapter/receptacle junction. The adapter may include a thermal sensor, however the sensor in the adapter may require additional wiring and terminals to interface the sensor to the plug. Therefore, a convenient and cost effective means for measuring the adapter/receptacle junction temperature may still be desired.

It may be possible for users to construct "home built" adapters for connecting a receptacle according to one technical standard to a plug following a different technical standard. However, the "home built" adapters would likely lack any thermal sensing capability. In order to guarantee that thermal sensing of the adapter/receptacle junction is provided, it may be desirable to detect whether an authorized adapter including thermal sensing capability is being used with the plug and operate the electronic device only when an approved adapter is detected.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, an electrical adapter assembly is provided. The electrical adapter assembly includes an adapter housing having a first face and a second face disposed on opposite sides of the adapter housing and an electrical receptacle defined by a first technical standard disposed within the first face of the adapter housing and configured to receive a first electrical plug defined by the first technical standard. The electrical adapter assembly further includes a second electrical plug defined by a second technical standard projecting from the second face of the adapter housing and electrically interconnected to the electrical receptacle and a thermally conductive member distinct from the electrical receptacle and the second electrical plug. The thermally conductive member is disposed within the adapter housing and projects from the first face.

According to a particular embodiment, the electrical receptacle includes a ground socket, a first power socket and a second power socket and the second electrical plug includes a ground pin, a first power blade and a second power blade. The ground socket is electrically coupled to the ground pin, the first power socket is electrically coupled to the first power blade and the second power socket is electrically coupled to the second power blade.

The thermally conductive member may be disposed intermediate the first power blade and the second power blade. The thermally conductive member may be a sealed heat pipe that is partially filled with a working fluid. At least a portion of the adapter housing may be formed of a thermally conductive dielectric material. At least a portion of the thermally conductive member within the adapter housing may be surrounded the thermally conductive dielectric material. The thermally conductive dielectric material has a greater thermal conductivity than a material forming the remainder of the adapter housing. A portion of the thermally conductive member projecting from the first face may be surrounded by a ferrule.

In accordance with another embodiment, an electrical device capable of receiving electrical power having various source voltages is provided. The electrical device includes an electrical adapter assembly as described supra and an electrical power supply cord that is terminated by the first electrical plug. A plug housing containing the first electrical plug defines a cavity that is configured to receive a portion of the thermally conductive member projecting from the first face. The plug housing further contains a thermal sensor that is disposed proximate to the cavity.

The electrical device may contains a means for detecting a connection of the electrical adapter assembly and the plug housing. This means may include an electrically conductive ferrule surrounding the portion of the thermally conductive member projecting from the first face and a first and second electrical contact disposed within the cavity and in electrical communication with a controller within the electrical device. The first and second contacts are configured to complete an electrical circuit through the electrically conductive ferrule when the thermally conductive member is received within the cavity. Alternatively, the means may include a magnet disposed in the adapter housing and a magnetic switch disposed in the plug housing. Otherwise, the means may include a wireless transmitter disposed in the adapter housing and a wireless receiver or transceiver disposed in the plug housing.

In accordance with yet another embodiment, an electrical assembly is provided. The electrical assembly includes an electrical adapter assembly that itself includes an adapter housing having a first face and a second face disposed on opposite sides of the adapter housing, an electrical receptacle defined by a first technical standard disposed within the first face of the adapter housing and configured to receive a first electrical plug defined by the first technical standard, and a second electrical plug defined by a second technical standard projecting from the second face of the adapter housing and electrically interconnected to the electrical receptacle. The electrical assembly further includes an electrical power supply cord terminated by a plug housing containing the first electrical plug and a means for detecting a connection of the electrical adapter assembly and the plug housing.

This means may include an electrically conductive ferrule surrounding the portion of the thermally conductive member projecting from the first face and a first and second electrical contact disposed within the cavity and in electrical communication with a controller within the electrical device. The first and second contacts are configured to complete an electrical circuit through the electrically conductive ferrule when the thermally conductive member is received within the cavity. Alternatively, the means may include a magnet disposed in the adapter housing and a magnetic switch disposed in the plug housing. Otherwise, the means may include a wireless transmitter disposed in the adapter housing and a wireless receiver or transceiver disposed in the plug housing.

BRIEF DESCRIPTION OF THE SEVERAL VIEWS OF THE DRAWING

The present invention will now be described, by way of example with reference to the accompanying drawings, in which:

FIG. 3A is an end view of a second plug end of the electrical adapter device of FIG. 2 according to the first embodiment;

FIG. 8 is cross-sectional top view of an electrical adapter device and a plug housing according to a fourth embodiment; and FIG. 9 is cross-sectional top view of an electrical adapter device and a plug housing according to a fifth embodiment.

DETAILED DESCRIPTION OF THE INVENTION

An electrical adapter device, hereinafter referred to as the adapter, is presented herein. The adapter has a receptacle on one end that conforms to a particular technical standard and has a plug on the other end that conforms to a non-compatible technical standard. The adapter may be used to connect a plug conforming to one technical standard, such as the National Electrical Manufacturers Association (NEMA) 6-15P, NEMA 5-20P, or NEMA 6-20P to a receptacle conforming to a different technical standard, such as NEMA 5-15R.

As used herein, a "technical standard" is a formalized public document that defines a uniform physical and/or electrical configuration for a product, whether promulgated by a standards body, a regulatory body, or as a "de facto" standard set by widespread adoption. Technical standards include the standards established by the National Electrical Manufacturers Association (NEMA) in the United States for use with alternating current (AC) electrical power connections, including but not limited to NEMA 5-15, NEMA 6-15, NEMA 5-20, and NEMA 6-20. Although a particular standard may have sub sections defining a receptacle configuration and plug configuration (and so designated with 'R' or 'P'), the description herein treats "a technical standard" as encompassing both receptacle and plug configurations in the same technical standard. The technical standards may also include standards defining electrical plugs and receptacles from outside of the United States, such as Types C through N defined by the International Electrotechnical Commission (IEC).

The adapter includes a thermally conductive member that is configured to conduct heat from terminals in the adapter connected to the receptacle to a thermal sensor located in the plug connected to the adapter so that the thermal sensor can monitor and determine the temperature of the terminals connected to the receptacle. The adapter and plug housing may additionally or alternatively contain devices that allow the plug to determine whether it is connected to an authorized adapter.

Figure 1B:
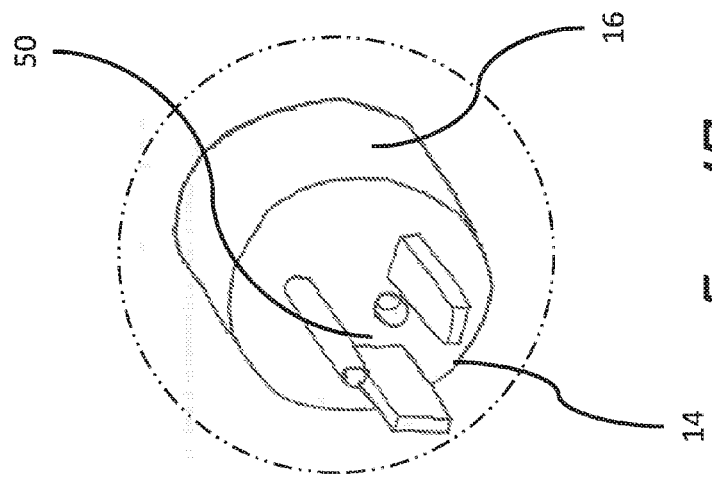
FIG. 1B is a close-up perspective view of the first plug in FIG. 1A defined by a first technical standard according to one embodiment.
Figure 1A:
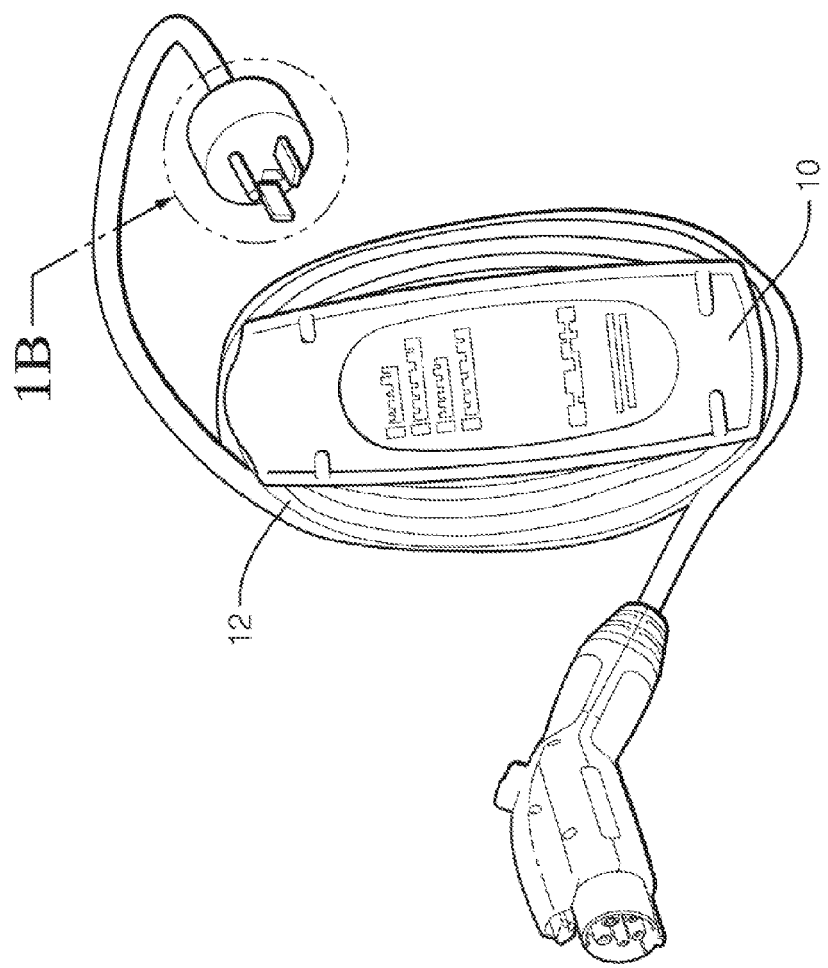
FIG. 1A is a perspective view of an electric vehicle battery charging device having a power supply cord terminated by a first plug according to one embodiment.
Figure 2:
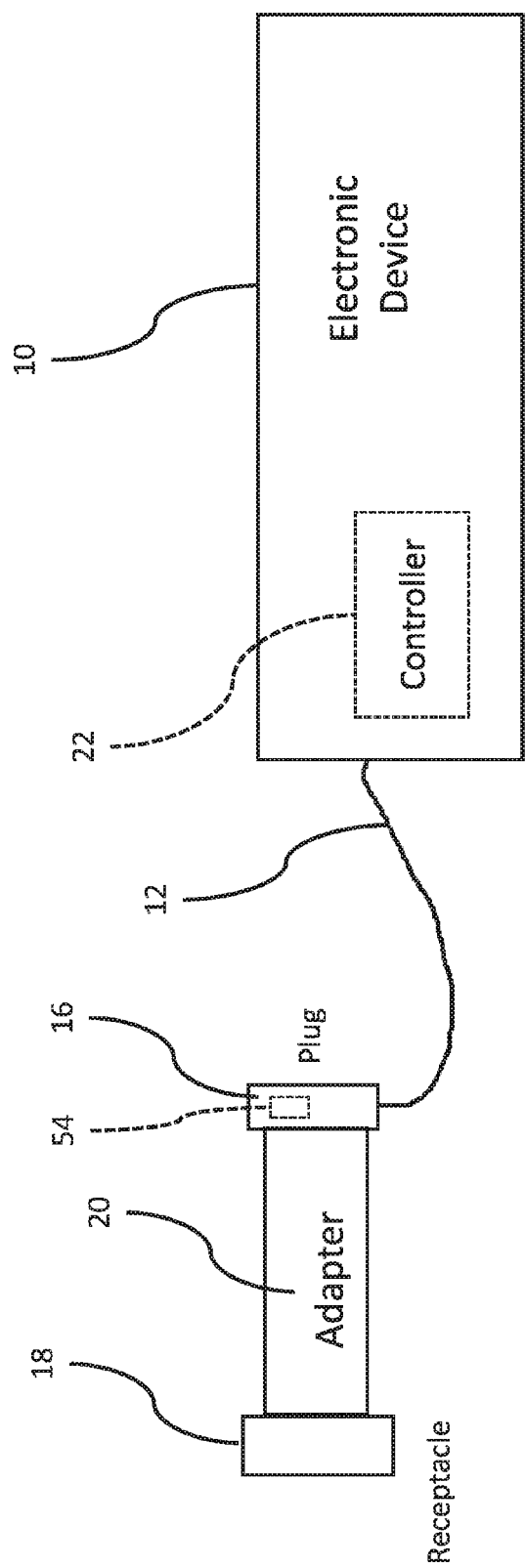
FIG. 2 is a schematic view of the electric vehicle battery charging device of FIG. 1 according to a first embodiment.

FIGS. 1, 1A, and 2 illustrate a non-limiting example of an electrical device 10, in this case an electric vehicle battery charging device 10 that has a power supply cord 12 terminated by a first electrical plug 14, hereinafter referred to as the first plug 14, contained within a plug housing 16. The electric vehicle battery charging device 10 is designed to operate from either a 110V/60 Hz AC or a 220V/60 Hz AC power source (not shown). The first plug 14, as shown in FIG. 1B, conforms to the NEMA 6-20 standard used in North America with 220V sources, in this case the NEMA 6-20P standard. As shown in FIG. 2, the first plug 14 is connected to a powered receptacle 18 conforming to a different standard, such as NEMA 5-15. The powered receptacle 18 is coupled to the power source, in this example the 110V/60 Hz AC. The first plug 14 is connected to the powered receptacle 18 via an adapter 20. The electric vehicle battery charging device 10 also includes a controller 22 configured to control the functions of the electric vehicle battery charging device 10, such as power state and power output levels. The plug housing 16 containing the first plug 14 includes a thermal sensor 24 that is configured to determine the temperature of the first plug 14. The thermal sensor 24 may be embedded within a thermally conductive material 26.

Figure 3:
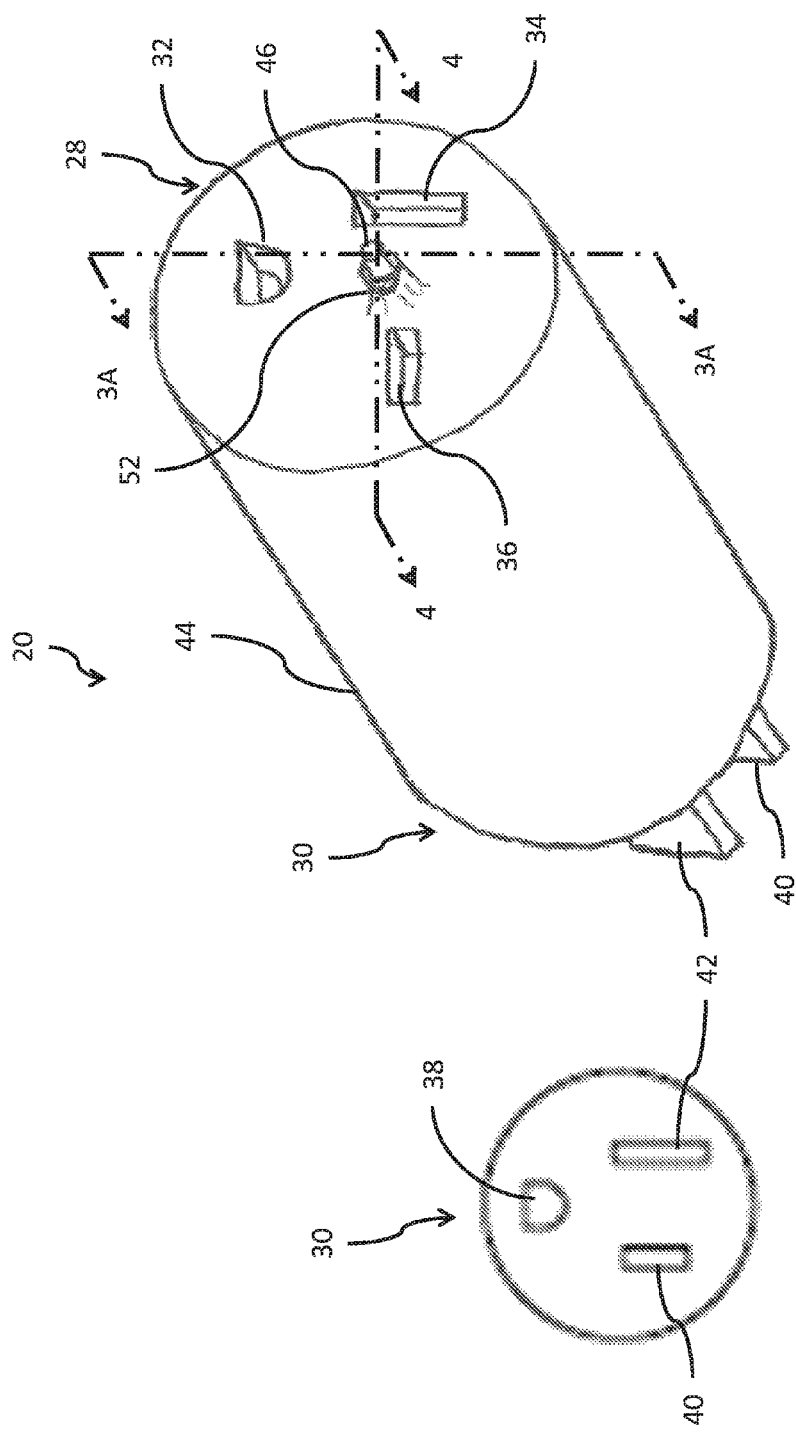
FIG. 3 is a perspective view of a receptacle end of an electrical adapter device according to a first embodiment.

A non-limiting example of the adapter 20 is shown in FIGS. 3 and 3A. The adapter 20 has an electrical receptacle 28 and a second electrical plug 30 that are defined by different technical standards. As illustrated in FIG. 3, one end of the adapter 20 contains an electrical receptacle 28 conforming to the NEMA 6-20 standard, in this case the NEMA 6-20R standard. The receptacle 28 is configured to accept the first plug 14 conforming to the same NEMA 6-20 standard. The receptacle 28 contains a ground socket 32, a first power socket 34, and a second power socket 36.

As shown in FIG. 3A, the other end of the adapter 20 contains a second electrical plug 30, hereinafter referred to as the second plug 20 conforming to a different technical standard than the electrical receptacle 28. In this example, the second plug 30 conforms to the NEMA 5-15P standard used with 110 volt sources. The second plug 20 contains a ground pin 38, a first power blade 40, and a second power blade 42. The ground socket 32 is electrically coupled to the ground pin 38, the first power socket 34 is electrically coupled to the first power blade 40, and the second power socket 36 is electrically coupled to the second power blade 42 within an adapter housing 44 having a generally circular cross section.

Figure 4:
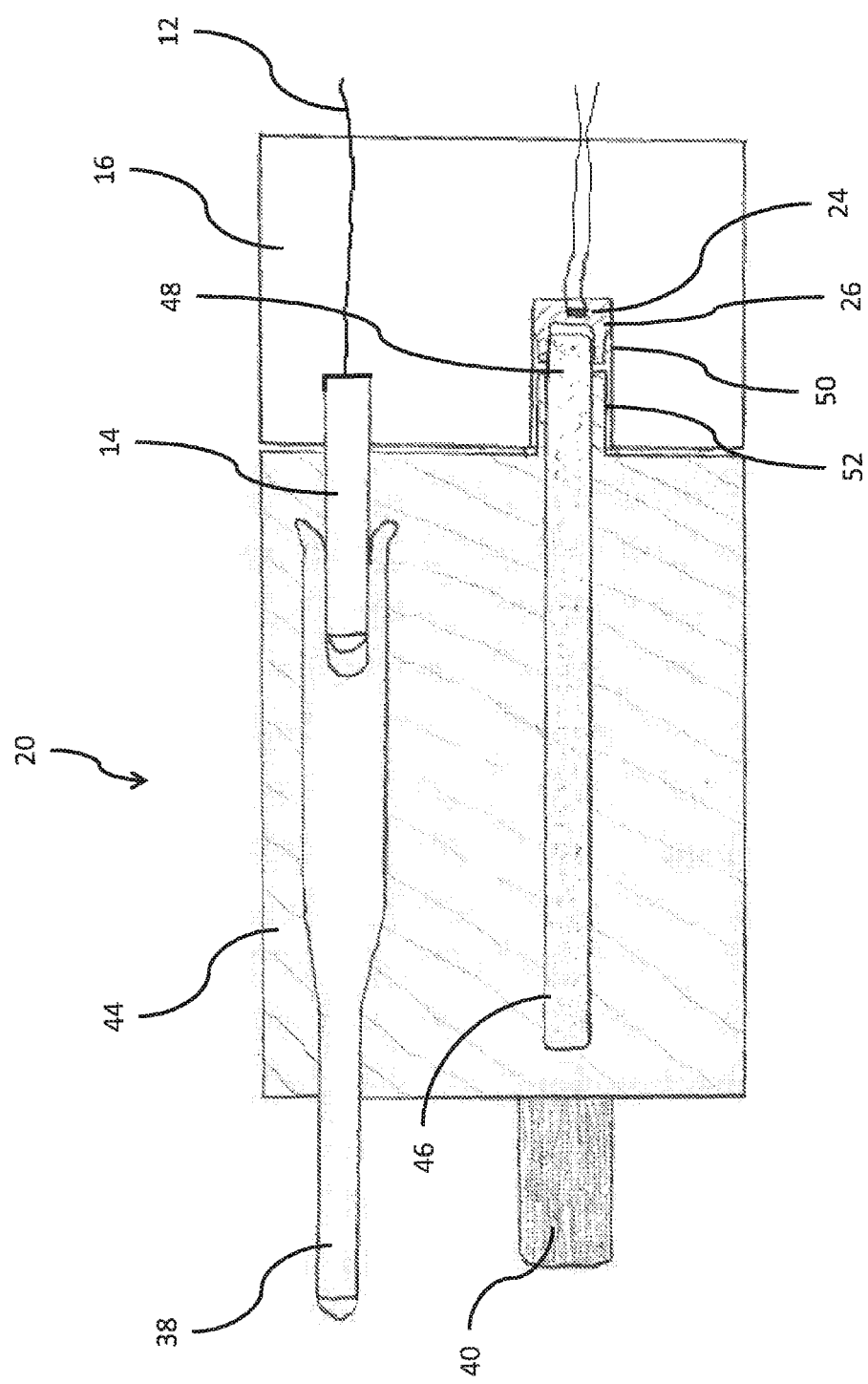
FIG. 4 is cross-sectional side view of the electrical adapter device of FIG. 2 and a plug housing according to the first embodiment.
Figure 5:
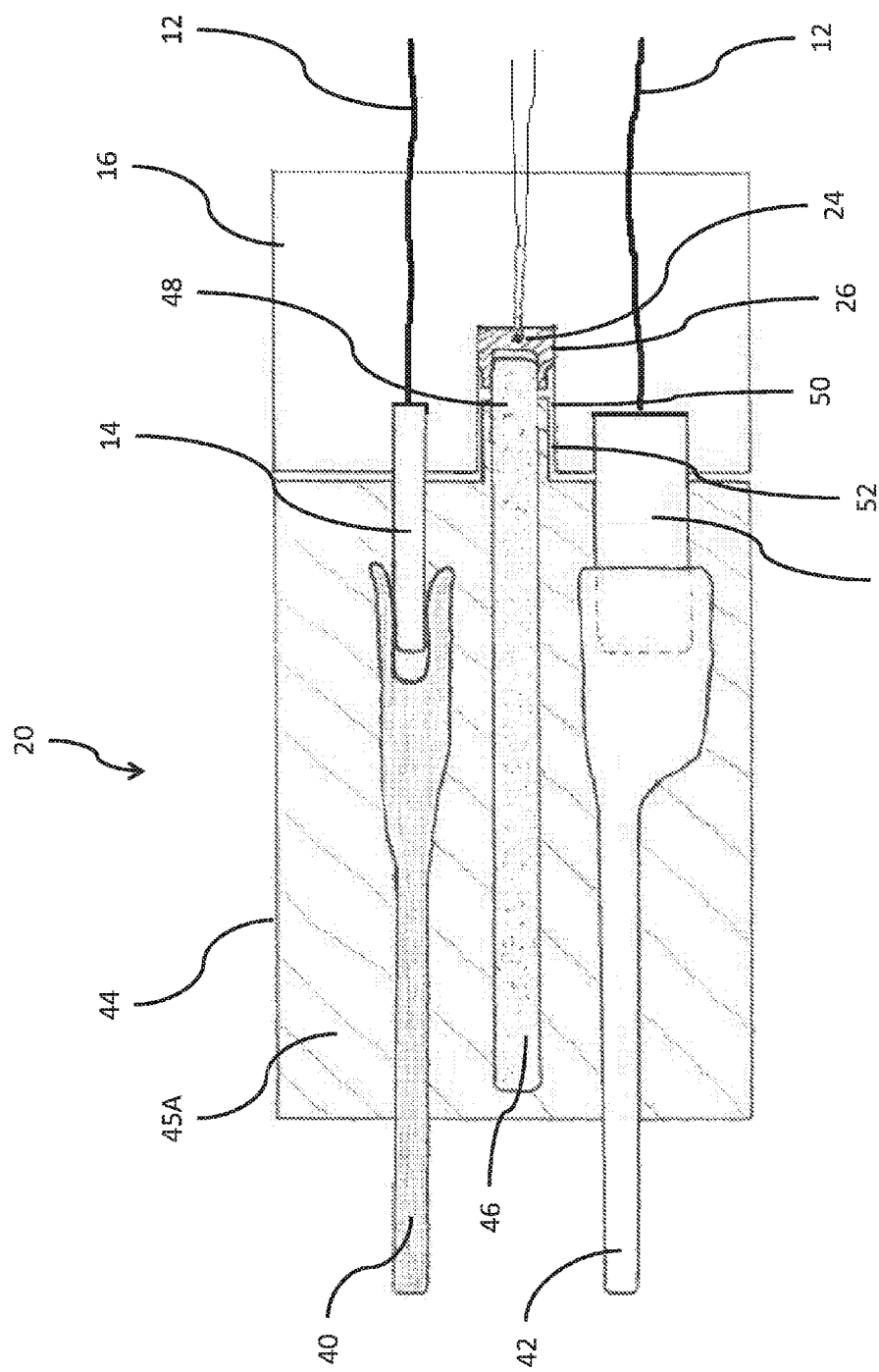
FIG. 5 is cross-sectional top view the electrical adapter device of FIG. 2 and the plug housing according to the first embodiment.

As shown in FIGS. 4 and 5, the adapter 20 includes a thermally conductive member 46 disposed within the adapter housing 44 located intermediate the first and second power blade 40, 42 in order to efficiently transfer heat generated by electrical current flowing through the first and second power blades 40, 42. The thermally conductive member 46 is distinct from the first and second power blades 40, 42. The thermally conductive member 46 may be a heat pipe comprising a sealed tube partially filled with a working fluid. The materials and techniques used to construct heat pipes are well known to those skilled in the art. Alternatively, the thermally conductive member 46 may be a rod formed of a thermally conductive material, such as a copper based or aluminum based material. An end 48 of the thermally conductive member 46 may project from the first face of the adapter 20 proximate the receptacle 28. This end 48 of the thermally conductive member 46 is configured to be received within a cavity 50 formed in the plug housing 16 as shown in FIGS. 4 and 5. A ferrule 52 may surround this end 48 of the thermally conductive member 46 to provide additional mechanical support. A thermal sensor 24, such as a thermistor, is disposed within the plug housing 16 in close proximity to the cavity 50 so that it is in proximity to the thermally conductive member 46 when the first plug 14 is connected to the receptacle 28 of the adapter 20.

Without subscribing to any particular theory of operation, the thermally conductive member 46 conducts heat from the first and second power blades 40, 42 to the thermal sensor 24 in the plug housing 16. The thermal sensor 24 is connected to the controller 22 within the electric vehicle battery charging device 10, e.g. by wires within the power supply cord 12.

The controller 22 may include a microprocessor, application specific integrated circuit (ASIC), or may be built from discrete logic and timing circuits (not shown). Software instructions that program the controller 22 to control the electric vehicle battery charging device 10 may be stored in a non-volatile (NV) memory device (not shown). The NV memory device may be contained within the microprocessor or ASIC or it may be a separate device. Non-limiting examples of the types of NV memory that may be used include electrically erasable programmable read only memory (EEPROM), masked read only memory (ROM), and flash memory.

The NV memory of the controller 22 contains instructions that, when executed, cause the controller 22 to monitor the signal from the thermal sensor 24, determine a temperature based on the signal, determine whether the temperature exceeds a safe operational threshold, and command the electric vehicle battery charging device 10 to take countermeasures to reduce the temperature when the controller 22 determines that the temperature exceeds the threshold. The countermeasures may include reducing and/or discontinuing power output from the electric vehicle battery charging device 10.

Figure 6:
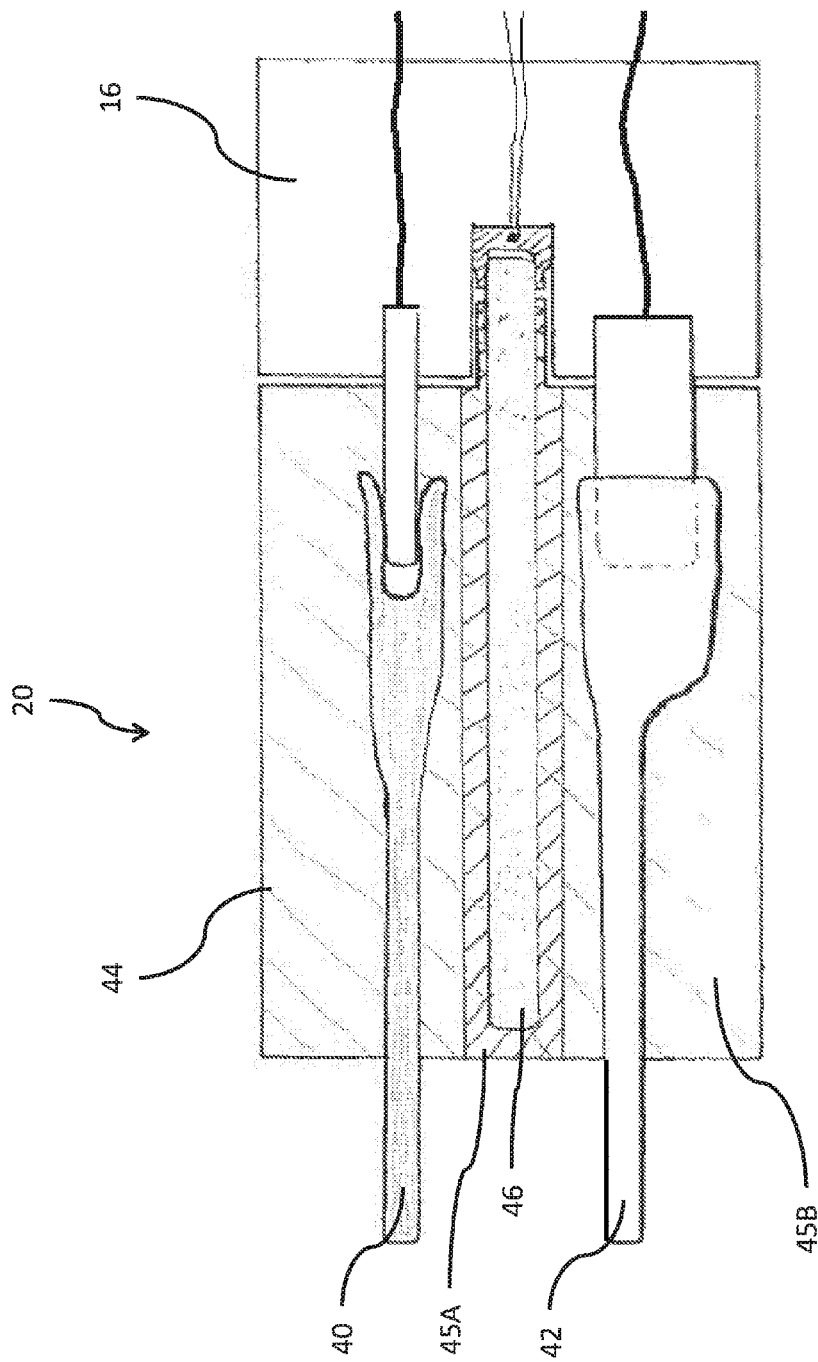
FIG. 6 is cross-sectional top view of an electrical adapter device and a plug housing according to a second embodiment.

The adapter housing 44 is formed of a dielectric material, e.g. polybutylene terephthalate (PBT), polypropylene (PP), or polyamide (PA, commonly known as NYLON). A thermally conductive filler material, such as boron nitride, may be added to the dielectric material to enhance thermal conductivity of the dielectric material. The entire adapter housing 44 may be formed of the enhanced dielectric material 45A as shown in FIG. 5 or a portion of the adapter housing 44 intermediate the first and second power blades 40, 42 and surrounding the thermally conductive member 46 may be formed of the enhanced dielectric material while the remaining dielectric material 45B forming the adapter housing 44 does not contain the thermally conductive filler material as shown in FIG. 6.

The sockets, pin and blades 32-40 are formed of a conductive material, such as a copper alloy. Each socket and corresponding blade or pin 32-40 is an integral assembly that is either insert molded into or assembled within the adapter housing 44 as shown in FIGS. 3-9. Alternatively, each socket and corresponding blade 32-40 may be separate elements that are connected by a wire (not shown) within a hollow cavity (not shown) defined by the adapter 20.

The adapter 20 and plug housing 16 may include features that cooperate to verify the presence of the adapter 20 connected to the first plug 14. As illustrated in FIG. 2, a detection device 54 in the plug housing 16 is connected to the controller 22 via wires running through the power supply cord 12. The NV memory may contain instructions that, when executed, cause the controller 22 to detect the voltage of the power supply, monitor a signal from the detection device 54 in the plug housing 16 if a 110 volt supply is detected, and perform a function, such as using a different temperature calibration coefficient to calculate the temperature based on the signal from the thermal sensor 24 when the adapter 20 is detected than is used when the adapter 20 is not detected. The use of different temperature calibration coefficients allows the different thermal characteristics of the plug housing 16/adapter 20 combination vs. the plug housing 16 alone to be accounted for when calculating the temperature based on the thermal sensor 24 signal.

In applications where the adapter 20 is used to accommodate different technical standards that each are used with a 220 volt power supply, such as IEC Types C through N, the controller 22 may not need to determine if a 110 volt supply is detected and would monitor a signal from the detection device 54 in the plug housing 16 if a 220 volt supply is detected.

The NV memory may also contain instructions that, when executed, cause the controller 22 to inhibit operation of the electric vehicle battery charging device 10 when the adapter 20 is not detected and the controller 22 detects a 110 volt power supply. This feature prevents the use of an unauthorized adapter that may not have thermal detection features with the electric vehicle battery charging device 10. Detecting the adapter 20 only when a 110 volt power supply is detected provides the benefit of not requiring a 220 volt powered receptacle 18 to include detection features since the adapter 20 is not required for use with a 220V power supply.

Figure 7:
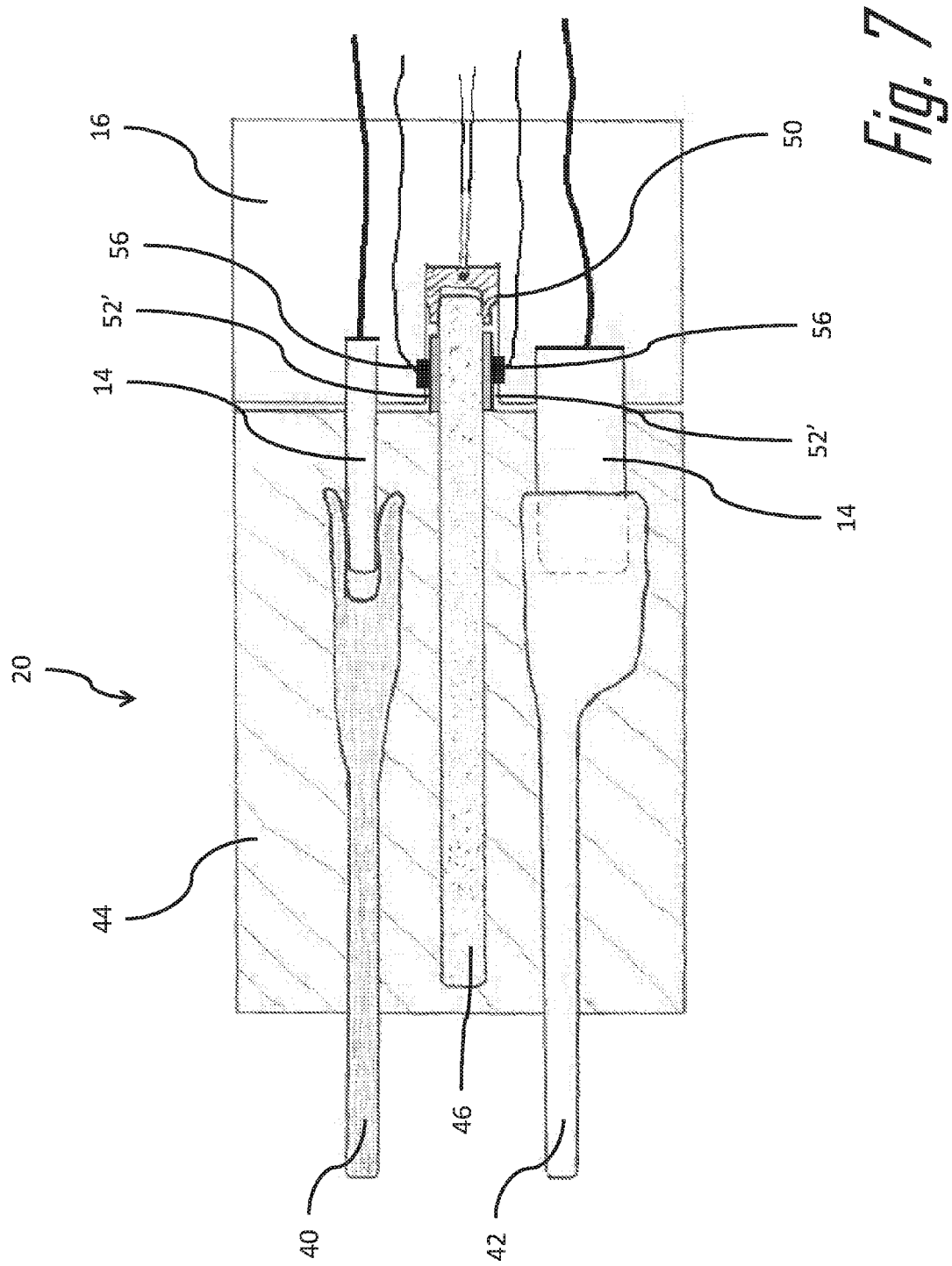
FIG. 7 is cross-sectional top view of an electrical adapter device and a plug housing according to a third embodiment.

As shown in the non-limiting example of FIG. 7, the ferrule 52 of the adapter 20 surrounding the thermally conductive member 46 is formed from an electrically conductive material. The cavity 50 of the plug housing 16 contains two electrical contacts 56 forming the detection device 54 that are configured to touch the conductive ferrule 52' when the first plug 14 is inserted into the receptacle 28 of the adapter 20. The contacts 56 are connected to the controller 22 via wire running through the power supply cord 12. The controller 22 detects the adapter 20 when the circuit through the contacts 56 is completed. The material forming the ferrule 52 may be selected to provide a specific resistance value. The NV memory may contain instructions that, when executed, cause the controller 22 to detect a resistance of the circuit and detect the presence of the adapter 20 only when the resistance falls within a predetermined range. This provides the benefit of preventing operation of the electric vehicle battery charging device 10 with an unauthorized adapter merely by short circuiting the contacts.

As shown in the non-limiting example of FIG. 8, the adapter housing 44 may include a magnet 58 and the plug housing 16 may include a magnetic switch 60, e.g. a sealed reed switch, a Hall Effect switch, a giant magnetoresistive (GMR) switch, or an anisotropic magnetoresistive (AMR) switch forming the detection device 54. The magnet 58 is configured so that the magnetic field strength of the magnet 58 is sufficient to active the magnetic switch 60 when the first plug 14 is inserted into the receptacle 28 of the adapter 20. The controller 22 detects the adapter 20 when the circuit through the magnetic switch 60 is completed.

As shown in the non-limiting example of FIG. 9, the adapter housing 44 may include a short range wireless transmitter 62 and the plug housing 16 may include a compatible wireless receiver or transceiver 64 forming the detection device 54. The transmitter 62 in the adapter 20 may be externally powered by the 110V power supply or internally powered by a battery. This powered transmitter 62 may conform to a technical standard such as BLUETOOTH or Near Field Communication (NFD). Alternatively, a non-powered transmitter 62, such as a Radio Frequency Identification (RFID) tag may be used with the transceiver 64 which transmits a signal to activate the RFID tag. The controller 22 detects the adapter 20 when the receiver or transceiver 64 receives a valid signal from the transmitter 62 in the adapter 20.

Other embodiments of the adapter may be envisioned that include the detection elements 54-64 that cooperate to verify the presence of the adapter connected to the first plug 14 but do not include the thermally conductive member 46.

Accordingly an electrical adapter device 20 configured to connect a first electrical plug 14 conforming to a first technical standard, such as NEMA 6-20 to a powered receptacle 18 conforming to a different technical standard, such as NEMA 5-15 is provided. The thermally conductive member 46 is position between the current carrying first and second power blades 40, 42 and can be sized to optimize detection of the first and second blade temperature. The thermally conductive member 46 can detect the temperature near the powered receptacle 18/second plug 20 interface as well as near the adapter receptacle 28/first plug 14 interface. The use of the thermally conductive member 46 obviates the need for a separate thermal sensor 24 in the adapter 20 and the electrical interface such a thermal sensor 24 would require. The thermally conductive member 46 allows the thermal sensor 24 in the plug housing 16 to more accurately measure the temperature of the first and second power blades 40, 42 and detect a temperature rise with less lag time. The adapter detection elements 54-64 provide the benefits of using different coefficients to determine temperature when the adapter 20 is in use and preventing use of unauthorized adapters.

While the illustrated examples contained herein show an adapter 20 that is configured to adapt plugs and receptacles between NEMA 5-15P and NEMA 6-20P technical standards used primarily in North America, other embodiments may be envisioned where the size, shape, and location of the first and second power, and ground blades and sockets conform to other technical standards used in different parts of the world, such as IEC Types C through N.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An electrical adapter assembly, comprising:
an adapter housing having a first face and a second face disposed on opposite sides of the adapter housing;
an electrical receptacle defined by a first technical standard disposed within the first face of the adapter housing and configured to receive a first electrical plug defined by the first technical standard;
a second electrical plug defined by a second technical standard projecting from the second face of the adapter housing and electrically interconnected to the electrical receptacle; and
a thermally conductive member disposed within the adapter housing and distinct from the electrical receptacle and the second electrical plug, said thermally conductive member configured to project from the first face and transfer heat from the second electrical plug to the first face, wherein a portion of the thermally conductive member projecting from the first face is surrounded by a ferrule.

2. The electrical adapter assembly according to claim 1, wherein the electrical receptacle includes a ground socket, a first power socket and a second power socket and the second electrical plug includes a ground pin, a first power blade and a second power blade.

3. The electrical adapter assembly according to claim 2, wherein the thermally conductive member is disposed intermediate the first power blade and the second power blade.

4. The electrical adapter assembly according to claim 2, wherein the ground socket is electrically coupled to the ground pin, the first power socket is electrically coupled to the first power blade and the second power socket is electrically coupled to the second power blade.

5. The electrical adapter assembly according to claim 1, wherein the thermally conductive member is a sealed heat pipe partially filled with a working fluid.

6. The electrical adapter assembly according to claim 1, wherein at least a portion of the adapter housing is formed of a thermally conductive dielectric material.

7. The electrical adapter assembly according to claim 6, wherein at least a portion of the thermally conductive member within the adapter housing is surrounded the thermally conductive dielectric material, said thermally conductive dielectric material having a greater thermal conductivity than a material forming the remainder of the adapter housing.

8. An electrical device capable of receiving electrical power having various source voltages, comprising:
an electrical adapter assembly, comprising:
an adapter housing having a first face and a second face disposed on opposite sides of the adapter housing,
an electrical receptacle defined by a first technical standard disposed within the first face of the adapter housing and configured to receive a first electrical plug defined by the first technical standard,
a second electrical plug defined by a second technical standard projecting from the second face of the adapter housing and electrically interconnected to the electrical receptacle, and
a thermally conductive member disposed within the adapter housing and distinct from the electrical receptacle and the second electrical plug, said thermally conductive member configured to project from the first face and transfer heat from the second electrical plug to the first face; and
an electrical power supply cord terminated by the first electrical plug, wherein a plug housing containing the first electrical plug defines a cavity configured to receive a portion of the thermally conductive member projecting from the first face, wherein the plug housing further contains a thermal sensor disposed proximate to the cavity.

9. The electrical device according to claim 8, wherein the electrical device contains a means for detecting a connection of the electrical adapter assembly and the plug housing.

10. The electrical device according to claim 9, wherein said means includes:
an electrically conductive ferrule surrounding the portion of the thermally conductive member projecting from the first face, and
a first and second electrical contact disposed within the cavity and in electrical communication with a controller within the electrical device, wherein said first and second contacts are configured to complete an electrical circuit through the electrically conductive ferrule when the thermally conductive member is received within the cavity.

11. The electrical device according to claim 9, wherein said means includes a magnet disposed in the adapter housing and a magnetic switch disposed in the plug housing.

12. The electrical device according to claim 9, wherein said means includes a wireless transmitter disposed in the adapter housing and a wireless receiver disposed in the plug housing.

13. The electrical device according to claim 9, wherein said means includes a wireless transmitter disposed in the adapter housing and a wireless transceiver disposed in the plug housing.

14. The electrical adapter assembly according to claim 8, wherein the electrical receptacle includes a ground socket, a first power socket and a second power socket and the second electrical plug includes a ground pin, a first power blade and a second power blade.

15. The electrical adapter assembly according to claim 14, wherein the thermally conductive member is disposed intermediate the first power blade and the second power blade.

16. The electrical adapter assembly according to claim 8, wherein the thermally conductive member is a sealed heat pipe partially filled with a working fluid.

17. The electrical adapter assembly according to claim 8, wherein at least a portion of the adapter housing is formed of a thermally conductive dielectric material.

18. The electrical adapter assembly according to claim 17, wherein at least a portion of the thermally conductive member within the adapter housing is surrounded the thermally conductive dielectric material, said thermally conductive dielectric material having a greater thermal conductivity than a material forming the remainder of the adapter housing.

19. An electrical assembly, comprising:
an electrical adapter assembly, further comprising:
an adapter housing having a first face and a second face disposed on opposite sides of the adapter housing,
an electrical receptacle defined by a first technical standard disposed within the first face of the adapter housing and configured to receive a first electrical plug defined by the first technical standard, and
a second electrical plug defined by a second technical standard projecting from the second face of the adapter housing and electrically interconnected to the electrical receptacle;
an electrical power supply cord terminated by a plug housing containing the first electrical plug; and
a means for detecting a connection of the electrical adapter assembly and the plug housing, further comprising:
an electrically conductive ferrule projecting from the first face, and
a first and second electrical contact disposed within a cavity defined by the plug housing and in electrical communication with a controller within the electrical device, wherein said first and second contacts are configured to contact the electrically conductive ferrule and complete an electrical circuit through the electrically conductive ferrule when the electrically conductive ferrule is received within the cavity.

* * * * *